Sept. 25, 1962  H. R. AUSSERBAUER  3,055,716
CRANKSHAFT BEARING FOR TWO-STROKE INTERNAL
COMBUSTION ENGINES
Filed Dec. 2, 1959

Inventor:
HELMUT RUDOLF AUSSERBAUER
By Richards & Geier
ATTORNEYS

United States Patent Office 3,055,716
Patented Sept. 25, 1962

3,055,716
CRANKSHAFT BEARING FOR TWO-STROKE
INTERNAL COMBUSTION ENGINES
Helmut Rudolf Ausserbauer, Ingolstadt (Danube), Germany, assignor to Auto-Union G.m.b.H., Ingolstadt (Danube), Germany
Filed Dec. 2, 1959, Ser. No. 856,728
Claims priority, application Germany Dec. 20, 1958
5 Claims. (Cl. 308—187.2)

The present invention relates to crankshaft bearings for two-stroke internal combustion engines with oil-in-gasoline or petrol lubrication, i.e. engines which are lubricated by adding a certain amount of lubricating oil to the fuel. In bearings of this type it is known to provide sealing elements on both sides of the crankshaft bearing for protecting the running surfaces of the antifriction bearing. It is further known to insert limit rings into the outer race of the bearing and to provide expanding rings which bear against the inner periphery of these limit rings. This has the advantage that during operation of the engine the lubricant is thrown outwardly inside of the limit rings, whereby the sealing surfaces between the bearing interior and the crankcase pumps are relieved of the lubricant pressure. On the other hand, with the engine at a standstill the viscosity and surface tension of the lubricant are sufficient to prevent leakage of lubricant past the annular sealing surfaces.

It is an object of the present invention to improve crankshaft bearings of this type in order to make them of particularly simple construction and render them suitable for mass production. The invention is based on a crankshaft bearing for multi-cylinder two-stroke internal combustion engines in which one of the races of the antifriction bearing is provided with lateral extensions serving as abutment for expanding rings, and in which in further development of this construction limit rings serving as abutments for the expanding rings are inserted in the outer race, the expanding rings being retained by a shoulder of a ring.

The principal feature of the present invention resides in the fact that the expanding rings are located axially by the end faces of the inner race. These end faces are small and may with little expenditure of work be made so plane and smooth that the gap between the rotating inner ring or race and the stationary expanding ring becomes very small, so that there will be no leakage of lubricant, neither while the engine is running nor while it is at a standstill. It is an important advantage of this construction that the shoulders on the guide rings, which serve to locate the expanding rings, can be manufactured in a simple manner and with great accuracy, and that leakage of lubricant through the gaps of the expanding rings is prevented by peripherally offsetting these gaps against each other.

A further advantage resides in the fact that the sealing surface is no longer subjected to the elastic deformations which occur when the crankshaft bearing journals are pressed into the crankshaft webs. In this manner the expanding rings are prevented from rotating, and overheating and damage of the expanding rings which would result from such rotation, are avoided.

The sealing effect is further improved by the fact that according to one of the embodiments of the present invention the longer leg of the C-shaped cross-sectional profile of the limit ring extends over the gap between the guide ring and the inner race, and the annular end face at the extremity of the longer leg forms a sealing gap together with a corresponding annular end face of a recess provided in the inner race. Thus, the gases are subjected to a plurality of subsequent deflections by surfaces standing at right angles to each other, which deflections they cannot execute on account of the pressure alternations which take place in rapid succession. In this manner, the lubricant in the bearing interior is protected to a high degree against ingress of exhaust gas components which would detrimentally affect the lubricant, as well as against mechanical impurities. By the C-shaped cross-section of the limit rings a large space for receiving the lubricant is created in the bearing interior, so that any exhaust gases which might eventually penetrate into the bearing can be neutralized by the additives contained in the lubricant, before they can begin to attack the bearing surfaces.

The outer race of the antifriction bearing accommodates the limit ring on a conical surface, whereby any distortion of the outer race is prevented in a most advantageous manner. Due to the almost knife-edged seating of the limit ring in the outer race, the limit ring can sealingly and firmly engage the outer race without deforming the latter.

According to a further embodiment of the present invention the limit ring is accommodated on the outer peripheral surface of the outer race. For this purpose the limit ring may extend over a rounded shoulder and engage in a groove formed in the outer race and may, for example, be rolled into said groove. The advantage resulting from such an arrangement is a larger space for accommodating lubricant on both sides of the rolling bodies of the antifriction bearing. In order to prevent under all circumstances any leakage of lubricant through the gap between outer race and limit ring under the effects of centrifugal force, sealing means may be provided between those two parts. Such sealing means are advantageously arranged between the end faces of the limit ring and of the outer race, and inside of the rolled-in surface of the outer race. In order to save weight, to make the lubricant space as large as possible, and to permit of calibrating the inner periphery of the limit ring in a simple manner, the latter is formed with an annular outward bulge. For the purpose of simplifying the seal between limit ring and outer race, the limit ring may preferably be made of light metal and may be provided with an abutment ring, preferably of steel or sintered metal. When the limit ring is pressed or rolled into the step-shaped recess of the outer race, the light metal is deformed without distorting the outer race at the peripheral surface thereof, and in this way an effective seal is provided against leakage of lubricant under the effects of centrifugal force.

Furthermore, it is of advantage to provide a shoulder in the end face of the guide ring facing the crank web, thereby on the one hand preventing the expanding ring from being distorted or clamped when the bearing is pressed in between the crank webs, and on the other hand providing between bearing and crank web a gap which is of such width that it cannot be bridged by lubricant which may leak from the bearing. In this manner the centrifugal force of such oil as may have been thrown against the crank webs, is prevented from affecting the surface tension of the lubricant, whereby any pumping action of lubricant which has penetrated into the space between the crank webs and the bearing is avoided.

Three embodiments which are given by way of example only will now be described with reference to the accompanying drawing.

FIGURE 1 of the drawing is a part-sectional view of a crankshaft bearing according to the present invention.

Figure 1:
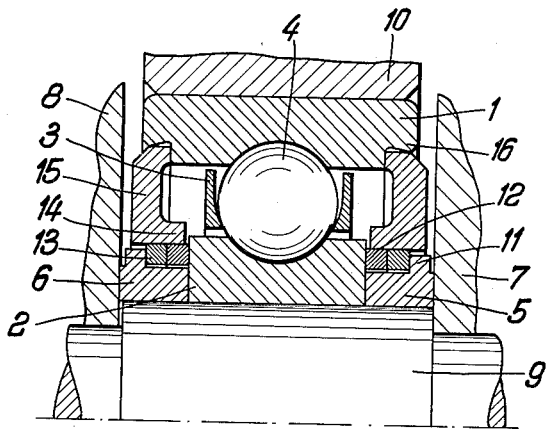

In a two-stroke internal combustion engine with oil-in-gasoline or petrol lubrication, a bearing comprising an outer race 1, an inner race 2, a cage 3 and balls 4 is installed as crankshaft center bearing. The inner race 2 is firmly retained on the journal 9 by the crank webs 7 and 8, through the intermediary of guide rings 5 and 6. The outer race is mounted in the usual manner in the crankcase 10. Each of the guide rings 5, 6 is provided with a flange 11 which retains expanding rings 12, 13. These expanding rings bear against the inner periphery of the longer leg 14 of the limit ring 15 which is of substantially C-shaped cross section. The outer rim or leg portion of each limit ring 15 is pressed into an annular recess or step 16 in the outer race 1. Thus the limit rings 15, the outer race 1 as well as the expanding rings 12, 13 are immovable, while the inner race 2, the guide rings 5 and 6, the crank webs 7 and 8 and the journal 9 are rotated. The expanding rings 12, 13 will engage the inner surfaces of the limit rings 15 due to their resiliency.

Figure 2:
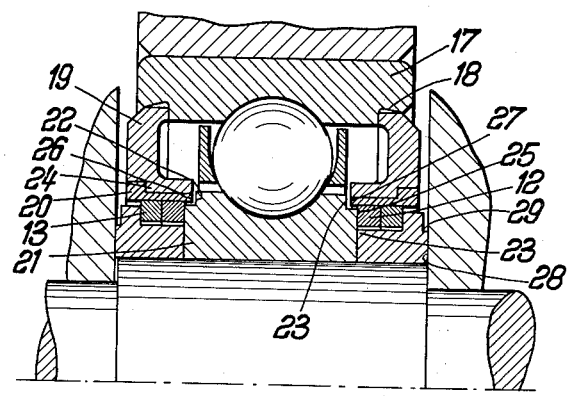
FIGURE 2 is a similar sectional view of a somewhat differently constructed crankshaft bearing.

In the embodiment shown in FIG. 2, the outer race 17 is provided with a conical recess 18 into which is pressed a limit ring 19 carrying a ring 20 which serves as radial abutment surface for the expanding rings 12, 13. The inner race 21 is formed with shoulders having end faces 22, 23. The longer leg 24 of the C-shaped cross-sectional profile of limit ring 19 extends over the point 25 where the guide rings 5, 6 abut against the inner race 21. The rings 20 extend axially and inwardly almost up to the end faces 22, or 23 of the inner race 21. The annular end faces 26, or 27 of the rings 20, in co-operation with the annular end faces 22, or 23 of the shoulder on the inner race 21, form a sealing gap in the plane in which the centrifugal force is effective. The flange 11 is placed inwardly from end of ring to provide shoulder 29 having an end surface 28. The guide rings 5, 6 are of smaller diameter than the inner race 21 of the antifriction bearing.

Figure 3:
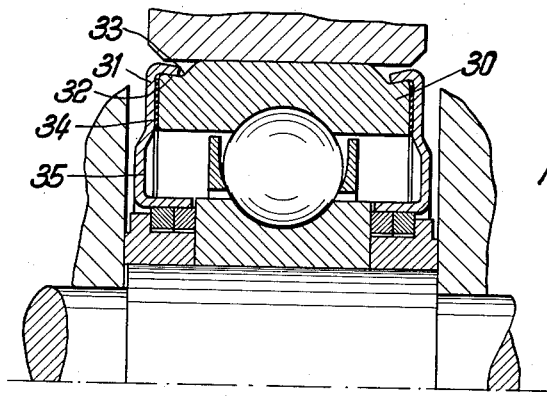
FIGURE 3 is a similar sectional view of yet another embodiment of the present invention.

FIG. 3 shows an embodiment in which the outer race 30 is adapted to receive limit rings 31 on shoulders 32. The limit ring 31 extends over the rounded shoulders 32 and engages in an annular groove 33 formed in the outer peripheral surface of the outer race 30. A seal 34 is provided between the outer race 30 and the limit ring 31. The limit ring 31 is formed with an annular outward bulge 35.

I claim:
1. In a crankshaft bearing for two-stroke internal combustion engines, an inner race, an outer race, balls between said inner race and said outer race, two guide rings on opposite sides on said inner race, each of said guide rings having a recessed portion adjacent the inner race and a radially extending outer flange intermediate the ends thereof, two separate expanding rings in each of said recessed portions, the outer pair of said expanding rings engaging the inner surfaces of said flange directed toward the inner race, the two other expanding rings being located adjacent the flat outer surfaces of said inner race, whereby the sealing effect of the bearing is improved by the expanding rings, two crank webs located on opposite sides of said guide rings, each of said guide rings having a flat surface engaging a separate crank web, said flange having a shoulder extending axially outwardly thereof and protecting said expanding rings against excessive pressure by said crank webs, said outer race having outer conical recesses, said limit rings having ends located in said conical recesses.

2. A crankshaft bearing in accordance with claim 1, wherein said limit rings consist of light metal.

3. In a crankshaft bearing for two-stroke internal combustion engines, an outer race, an inner race, said inner race having shouldered portions on opposite flat surfaces thereof, balls between said inner race and said outer race, two guide rings on opposite sides on said inner race, each of said guide rings having a recessed portion adjacent the inner race and a radially extending outer flange intermediate the ends thereof, two separate expanding rings in each of said recessed portions, the outer pair of said expanding rings engaging the inner surfaces of said flange directed toward the inner race, the two other expanding rings being located adjacent the flat outer surfaces of said inner race, whereby the sealing effect of the bearing is improved by the expanding rings, two crank webs located on opposite sides of said guide rings, each of said guide rings having a flat surface engaging a separate crank web, said flange having a shoulder extending axially outwardly thereof and protecting said expanding rings against excessive pressure by said crank webs, two C-shaped limit rings located on opposite sides of said balls and having outer legs and inner legs, said outer legs engaging said outer race, and other rings engaging the inner legs of said limit rings and said expanding rings, said inner legs extending into said shouldered portions of the inner race.

4. In a crankshaft bearing for two-stroke internal combustion engines, an inner race, an outer race, balls between said inner race and said outer race, two guide rings on opposite sides on said inner race, each of said guide rings having a recessed portion adjacent the inner race and a radially extending outer flange intermediate the ends thereof, two separate expanding rings in each of said recessed portions, the outer pair of said expanding rings engaging the inner surfaces of said flange directed toward the inner race, the two other expanding rings being located adjacent the flat outer surfaces of said inner race, whereby the sealing effect of the bearing is improved by the expanding rings, two crank webs located on opposite sides of said guide rings, each of said guide rings having a flat surface engaging a separate crank web, said flange having a shoulder extending axially outwardly thereof and protecting said expanding rings against excessive pressure by said crank webs, two limit rings located on opposite sides of said balls, and a separate seal ring located between the outer race and each limit ring.

5. In a crankshaft bearing for two-stroke internal combustion engines, an inner race, an outer race, balls between said inner race and said outer race, two guide rings on opposite sides on said inner race, each of said guide rings having a recessed portion adjacent the inner race and a radially extending outer flange intermediate the ends thereof, two separate expanding rings in each of said recessed portions, the outer pair of said expanding rings engaging the inner surfaces of said flange directed toward the inner race, the two other expanding rings being located adjacent the flat outer surfaces of said inner race, whereby the sealing effect of the bearing is improved by the expanding rings, two crank webs located on opposite sides of said guide rings, each of said guide rings having a flat surface engaging a separate crank web, said flange having a shoulder extending axially outwardly thereof and protecting said expanding rings against excessive pressure by said crank webs, and two limit rings located on opposite sides of said balls, each of said limit rings having an outer portion engaging said outer race, an inner cylindrical portion engaging a separate pair of said expanding rings, and a plate-like outwardly bulging intermediate portion located between said outer and inner portions.

References Cited in the file of this patent
UNITED STATES PATENTS

| | | |
|---|---|---|
| 2,029,072 | Hughes | Jan. 28, 1936 |
| 2,208,700 | Murden | July 23, 1940 |
| 2,759,778 | Anderson | Aug. 21, 1956 |

FOREIGN PATENTS

| | | |
|---|---|---|
| 361,276 | Great Britain | Nov. 19, 1931 |
| 965,204 | France | Feb. 15, 1950 |
| 1,041,730 | Germany | Oct. 23, 1958 |